(12) United States Patent
Artemenko et al.

(10) Patent No.: US 9,768,500 B2
(45) Date of Patent: Sep. 19, 2017

(54) RADIO-RELAY COMMUNICATION SYSTEM WITH BEAM-SCANNING ANTENNA

(71) Applicant: LIMITED LIABILITY COMPANY "RADIO GIGABIT", Moscow (RU)

(72) Inventors: Aleksey Andreevich Artemenko, Nizhniy Novgorod (RU); Vladimir Nikolaevich Ssorin, Nizniy Novgorod (RU); Roman Olegovich Maslennikov, Nizhniy Novgorod (RU); Andrey Viktorovich Mozharovskiy, Nizhniy Novgorod (RU)

(73) Assignee: LIMITED LIABILITY COMPANY "RADIO GIGABIT", Moscow (RU)

( * ) Notice: Subject to any disclaimer, the term of this patent is extended or adjusted under 35 U.S.C. 154(b) by 78 days.

(21) Appl. No.: 14/861,311

(22) Filed: Sep. 22, 2015

(65) Prior Publication Data

US 2016/0013550 A1 Jan. 14, 2016

Related U.S. Application Data

(63) Continuation of application No. PCT/RU2014/000167, filed on Mar. 18, 2014.

(30) Foreign Application Priority Data

Mar. 22, 2013 (RU) .................. 2013112768

(51) Int. Cl.
*H01Q 3/26* (2006.01)
*H01Q 3/24* (2006.01)
(Continued)

(52) U.S. Cl.
CPC .............. *H01Q 3/24* (2013.01); *H01Q 3/245* (2013.01); *H04B 1/38* (2013.01); *H04B 7/155* (2013.01);
(Continued)

(58) Field of Classification Search
None
See application file for complete search history.

(56) References Cited

U.S. PATENT DOCUMENTS 4,574,287 A 3/1986 Waters et al.
5,185,613 A 2/1993 Whatmore et al.
(Continued)

FOREIGN PATENT DOCUMENTS

EP 0427201 A2 5/1991
FR 2581798 A1 11/1986
(Continued)

OTHER PUBLICATIONS

Dou, W.B. and Z.L. Sun, "Ray tracing on extended hemispherical and elliptical silicon dielectric lenses," International Journal of Infrared and Millimeter Waves, vol. 15, pp. 1993-2002, No. 1 L, 1995.

(Continued)

*Primary Examiner* — Chi H Pham
*Assistant Examiner* — Shick Hom
(74) *Attorney, Agent, or Firm* — Sughrue Mion, PLLC

(57) ABSTRACT

A radio-relay communication system having a radio-frequency transceiver units and a beam-scanning antenna is provided. It is configured for electronic scanning by switching between primary antenna elements. The system provides electronic scanning without losses or with low losses with each radio-frequency transceiver unit being electrically connected to at least one primary antenna element of the beam-scanning antenna. The antenna beam scanning is accomplished through the signal distribution units selecting at least one of radio-frequency transceiver units for processing of the received and generation of the transmitted signals in a given spatial direction.

15 Claims, 8 Drawing Sheets

(51) Int. Cl.
*H04B 1/38* (2015.01)
*H04B 7/155* (2006.01)
*H04L 5/14* (2006.01)

(52) U.S. Cl.
CPC ......... *H04B 7/1555* (2013.01); *H04L 5/1469* (2013.01); *H04L 5/14* (2013.01)

(56) References Cited

U.S. PATENT DOCUMENTS

| | | | |
|---|---|---|---|
| 5,481,268 | A | 1/1996 | Higgins |
| 5,486,832 | A | 1/1996 | Hulderman |
| 5,706,017 | A | 1/1998 | Büttgenbach |
| 5,966,103 | A | 10/1999 | Pons et al. |
| 6,034,641 | A | 3/2000 | Kudoh et al. |
| 6,317,096 | B1 | 11/2001 | Daginnus et al. |
| 6,587,699 | B2 | 7/2003 | Olsen et al. |
| 6,590,544 | B1 | 7/2003 | Filipovic |
| 6,859,187 | B2 | 2/2005 | Ohlsson |
| 7,642,961 | B1 | 1/2010 | Rausch |
| 7,667,665 | B1 | 2/2010 | Colburn et al. |
| 7,683,844 | B2 | 3/2010 | Alamouti et al. |
| 7,688,263 | B1 | 3/2010 | Oxley |
| 7,834,803 | B2 | 11/2010 | Weinstein |
| 7,844,217 | B2 | 11/2010 | Charash |
| 2002/0164945 | A1 | 11/2002 | Olsen et al. |
| 2003/0022694 | A1* | 1/2003 | Olsen ............... G01V 8/005 455/562.1 |
| 2004/0072579 | A1 | 4/2004 | Hottinen |
| 2004/0174299 | A1 | 9/2004 | Casas et al. |
| 2005/0020311 | A1 | 1/2005 | Goldberg et al. |
| 2006/0114158 | A1* | 6/2006 | Chiang ............... H01Q 3/40 342/424 |
| 2008/0153549 | A1 | 6/2008 | Korevaar et al. |
| 2008/0284655 | A1 | 11/2008 | Alamouti et al. |
| 2009/0007185 | A1 | 1/2009 | Nix et al. |
| 2010/0052987 | A1 | 3/2010 | Weinstein |
| 2011/0095953 | A1 | 4/2011 | Lier |
| 2012/0026998 | A1* | 2/2012 | O'Keeffe ............ H01Q 1/246 370/338 |
| 2013/0285848 | A1 | 10/2013 | Grau Besoli et al. |
| 2014/0227966 | A1 | 8/2014 | Artemenko et al. |
| 2015/0116154 | A1 | 4/2015 | Artemenko et al. |
| 2016/0013550 | A1 | 1/2016 | Artemenko et al. |

FOREIGN PATENT DOCUMENTS

| | | |
|---|---|---|
| FR | 2705169 A1 | 11/1994 |
| GB | 2459131 A | 10/2009 |
| JP | 201210245 A | 1/2012 |
| RU | 2177662 C1 | 12/2001 |
| RU | 2236073 C2 | 9/2004 |
| RU | 2291527 C2 | 1/2007 |
| RU | 68191 U1 | 11/2007 |
| RU | 2349007 C1 | 3/2009 |
| RU | 2474045 C2 | 1/2013 |
| RU | 2476015 C2 | 2/2013 |
| RU | 2494506 C1 | 9/2013 |
| WO | 2004051803 A1 | 6/2004 |
| WO | 2004077607 A2 | 9/2004 |
| WO | 2007136289 A1 | 11/2007 |
| WO | 2012161612 A1 | 11/2012 |
| WO | 2013/058673 A1 | 4/2013 |
| WO | 2014011087 A1 | 1/2014 |

OTHER PUBLICATIONS

Filipovic, D.F. et al., "Off-Axis Properties of Silicon and Quartz Dielectric Lens Antennas", IEEE Trans. On Antennas and Propagation, vol. 45, No. 5, pp. 760-766, May 1997.

Filipovic D F et al: "Double-slot Antennas on Extended Hemispherical and Elliptical Silicon Dielectric Lenses", IEEE Transactions on Microwave Theory and Techniques, IEEE Service Center, Piscataway, NJ, US, vol. 41, No. 10, Oct. 1, 1993 (Oct. 1, 1993). pp. 1738-1749, ISSN: 0018-9480, DOI: 10.1109/22.247919.

Alexey Artemenko et al: "Millimeter-Wave Electronically Steerable Integrated Lens Antennas for WLAN/WPAN Applications", IEEE Transactions on Antennas and Propagation, IEEE Service Center, Piscataway, NJ, US, vol. 61, No. 4, Apr. 1, 2013 (Apr. 1, 2013), pp. 1665-1671, XP011499218, ISSN: 0018-926X, DOI: 10.1109/TAP. 2012.2232266.

Fernandes C A et al: "Shaped Coverage of Elongated Cells At Millimetre Waves Using a Dielectric Lens Antennas", Proceedings of the 25th European Microwave Conference 1995. Bologna, Sep. 4-7, 1995; [Proceedings of the European Microwave Conference], Swanley, Nexus Media, GB, vol. Conf. 25, Sep. 4, 1995 (Sep. 4, 1995), pp. 66-70, XP000740148, ISBN: 978-1-899919-15-4.

International Search Report for PCT/RU2014/000167 dated Jan. 22, 2015.

* cited by examiner

RADIO-RELAY COMMUNICATION SYSTEM WITH BEAM-SCANNING ANTENNA

CROSS-REFERENCE TO RELATED APPLICATIONS

This application is a continuation of International application PCT/RU2014/000167 filed on Mar. 18, 2014 which claims priority benefits to Russian patent application RU 2013112768 filed on Mar. 22, 2013. Each of these applications is incorporated herein by reference for all purposes.

TECHNICAL FIELD

The invention relates to radio communication, in particular to high throughput point-to-point and point-to-multipoint communications in the millimeter wave band, provided by radio-relay communication systems capable of electronic beam scanning.

BACKGROUND

Millimeter wave radio-relay communication systems are designed for providing high throughput point-to-point and point-to-multipoint communication over the distances up to several kilometers in line-of-sight conditions. Such systems are widely used in different transport networks for various applications, where the most advanced are backhaul networks between cellular communication base stations.

Current radio-relay systems use different radio-frequency bands from 2 to 100 GHz. With growing demands for the transmission data rate, use of high-frequency bands is becoming more advantageous. With higher carrier frequency, greater transmission data rate is usually achieved by using broader band connectivity.

However, free space propagation losses grow with the increase of a carrier frequency value. To compensate the losses, aperture antennas (which have antenna size much greater than operating wavelength) with high directivity and, consequently, narrow radiation pattern (RP) beam are used.

Further, narrow antenna beam allows every radio-relay communication link to operate independently from other communication links and ensures interference-free conditions for any devices located proximately due to significant localization of radiation in space. Thus, for example, the Russian State Radio Frequency Commission requirements as of 15 Jul. 2010, No. 10-07-04-1 originally prescribed that antenna pattern beamwidth for the radio-relay system operating in the wavebands 71-76/81-86 GHz shall not exceed 1 degree. However, at present the document No. 10-07-04-1 was modified (modifications were approved by the Russian State Radio Frequency Commission decision No. 14-27-07 approved 13 Oct. 2014) and accordingly antenna pattern beamwidth shall not exceed 2.5 degree. The corresponding maximum allowed beamwidth in 71-76/81-86 GHz bands in USA is 1.2 degree as it is set by Federal Communication Commission, Title 47 of the Code of Federal Regulations, Part 101.115.

However, narrow-beam antennas may be easily misaligned and may disrupt communication even with slight changes in orientation of the radio-relay communication system caused by accidental sways of its mounting structures, for example, due to vibrations, wind, or heating of the mounting structures. To provide quick automatic and unmanned beam adjustment in the angle ranges of several beam widths, aperture antenna devices with electronic beam scanning are introduced and becoming more commonly used in different fields of radio communications, including different radar applications, local communication systems, and radio-relay communication systems. Beam-scanning antennas also often provoke a redesign of the transceiver system.

Electronic beam adjustment allows the main beam direction of the antenna pattern to be quickly automatically adapted to compensate changing in orientation of the radio-relay communication system. Additionally, beam electronic adjustment significantly simplifies the mechanical positioning system for allowing precise antenna adjustment.

Electronic beam scanning can be implemented in several ways. For large aperture antennas, the most efficient way of scanning is switching over a number of beam directions. Such switching is accomplished by means of high-frequency commutation circuit connected to the feed antenna array of a given aperture antenna.

However, one disadvantage of this switching approach is increased losses in the high-frequency signal commutation circuit. Such commutation circuit generally comprises at least one semiconductor switch which cannot be realized without any losses due to technological limitations. Apparently, these losses will grow with the increase of the operating frequency in the circuit that can be shown by analysis of commercially available switches of various frequency bands. Existing N-position switches of a frequency band over 60 GHz cause losses of about $0.7 \div 1.5 * N$ dB. For example, losses in a 4-position switch TGS4306-FC produced by Triquint Semiconductors are over 3 dB (that means that switching causes half the power loss). Further, one should also consider losses (about 1 dB) caused by installation of the switch into a switching circuit (for example, on a printed board).

The following is a description of known antennas with the electronic beam scanning, as well as radio-relay communication systems and radars using beam-scanning antennas of various configurations.

Point-to-Point Radio-Relay Communication Systems with Electronic Beam Scanning

PCT/RU2011/000814 "SYSTEM AND METHOD OF RELAY COMMUNICATION WITH ELECTRONIC BEAM ADJUSTMENT" discloses a point-to-point radio-relay communication system with electronic beam steering. The system comprises two line-of-sight transceiver units. Each of transceiver units comprises an antenna providing electronic switching of beam direction and a control module configured for implementation of the antenna beam control algorithm based on input of the system's service information.

Further, there are a number of different configurations of beam-scanning antennas known. Thus, U.S. Pat. No. 7,834,803 discloses the Cassegrain antenna with electronic beam steering. This antenna comprises a Cassegrain antenna (or any other type of antennas with space-apart feeding radiators) and an array of horn antennas performing the function of primary feed antenna elements. Such antenna allows electronic steering of the beam in various radar applications.

PCT/RU2011/000371 discloses another beam steering antenna. The antenna is an integrated lens antenna with an array of primary antenna elements placed on a plane surface of the lens generating a narrow beam when each one of antenna elements is excited and all other are inactive. Placement of antenna elements on the plane surface of the dielectric lens is what distinguishes integrated lens antennas from other types of lens antennas, such as horn lens antennas, Fresnel lens, thin (as compared with focal distance) lens with separately standing primary antenna elements. Such location of antenna elements reduces electric length of the wave when it is radiated into the lens: the greater the dielectric permittivity, the shorter the distance. This provides miniaturization of the antenna elements and their placement at small distances from each other. Thus, the required space of the antenna array is made considerably smaller than for other types of antennas with antenna elements and the main focusing device (mirror or lens) spaced apart from each other.

On the other hand, close placement of antenna elements ensures small angular distance between the directions of main antenna pattern beams during scanning. Based on this, development of scanning integrated lens antennas becomes possible, thus ensuring sufficiently large overlap of beams during scanning and, consequently, enabling scanning in a certain continuous angle range exceeding antenna beamwidth. This advantage of integrated lens antennas is particularly significant for the radio-relay communication applications.

Point-to-Multipoint Radio-Relay Communication Systems with a Plurality of Antennas U.S. Pat. No. 7,844,217 "POINT-TO-MULTIPOINT COMMUNICATION TERMINAL HAVING A SINGLE RF CHAIN" discloses a radio-relay communication system comprising two directional antennas with fixed beams to communicate with spaced-apart remote terminals (see FIG. 1). The system comprises only one transmitter and one receiver, while an antenna for transmission and reception of signal is selected with a high-frequency switching circuit. It is evident that the system can only provide communication in time division duplexing mode. Additionally, transmission of the signal to two remote terminals is to be carried out during different time intervals, which reduces the total data rate of communication between the system and either of the remote terminals. At the same time, the system's modem shall comprise a selection unit of information stream for signal processing from/for either of the remote terminals, synchronized with the high-frequency switching circuit.

A disadvantage of the system is also high losses in the switching circuit operating in the millimeter wave band. Furthermore, the system does not provide frequency division of reception and transmission to enable reception and transmission simultaneously in different frequency bands.

Automotive Radars of Millimeter Wave Band

The design of automotive radars of millimeter wave band is largely similar to the design of radio-relay systems with a beam-scanning antenna. U.S. Pat. No. 6,034,641 "ANTENNA DEVICE" discloses the automotive radar device. A general diagram of this device is shown in FIG. 2.

The automotive radar comprises a plurality of independent radar elements, each comprising RF reception and transmission modules, switching circuits of received and transmitted signals and an array of primary antenna elements which are designed to provide electronic scanning in the antenna system. The antenna system can be based on the lens antenna, reflector antenna or other type of aperture antennas.

Disadvantageously, usage of a high-frequency signal switching circuit leads to additional losses in the radio frequency front-end. Such additional losses result in smaller range of coverage of the radar or of the radio communications system, which might in some cases makes the use of electronic beam scanning systems inefficient or impossible.

The most obvious way to reduce losses in a high-frequency switching circuit is to develop a more effective millimeter wave band switches. However, this approach appears to be rather hard to implement and fails to ensure zero losses due to insufficient development of semiconductor technologies at present.

U.S. Pat. No. 5,486,832 "RF SENSOR AND RADAR FOR AUTOMOTIVE SPEED AND COLLISION AVOIDANCE APPLICATIONS" discloses another solution applied to automotive millimeter wave band radars. The diagram of this solution is shown in FIG. 3. The device uses an antenna providing electronic beam scanning by means of switching between primary antenna array elements. The switching circuit of this device is implemented at baseband frequency and uses a set of received signal mixers, each connected to one primary antenna element.

However, the automotive radar cannot be used in radio relay systems for a number of reasons. First, this radar can scan only with a receiving beam, as antenna elements are only connected to receiving mixers. Signal radiation is accomplished by a separate antenna with a broad radiation pattern. The radio-relay system requires both signal reception and signal transmission, which is conceivable if, instead of receiving mixers, more complex radiofrequency units are used, which are capable of processing the received signal and generating transmission signal using one of the known radio transmission duplex modes. Further, two signal distribution (switching) units are required. Secondly, in the radar under consideration, sequential switching across all antenna elements to be processed in the CPU is provided, which is determined by specific features of radars. That is why, the input of the beam selection unit is connected only to the reference signal generator, based on which sequential switching of beam position takes place. In the radio-relay system, the beam position control module shall have expanded functionality, including ability to switch the beam randomly using the built-in algorithms and service information received from the system's modem. This is predetermined by the random nature of twists and sways effects in the mounting structures exposed to vibrations, wind, heating of the components, etc., which effects are sought to be compensated by means of beam-scanning antennas in radio-relay systems.

The prototype for the present invention is a point-to-point radio-relay communication system with electronic beam scanning disclosed in PCT/RU2011/000814. However, usage of the beam-scanning antennas in such a radio-relay communication system requires a switching circuit distributing the signal from the transceiver to one of primary antenna elements.

Generally, the prototype system comprises (FIG. 4):

a beam-scanning antenna with at least two primary antenna elements, a radio-frequency transceiver unit, a received signal distribution unit configured to distribute a received signal and connected to the radio-frequency transceiver unit, a transmitted signal distribution unit configured to distribute a transmitted signal and connected to the radio-frequency transceiver unit, a digital-to-analog and analog-to-digital converter units, a modem comprising a modem reception part and a modem transmission part and an antenna beam control unit configured to control a beam direction and connected to the modem reception part and the modem transmission part via supervisory channels, the unit being further connected to the received signal distribution unit and the transmitted signal distribution unit via beam control channels, thus enabling supply of beam control signals to them.

The beam-scanning antenna can provide electronic beam scanning by means of switching between primary antenna elements accomplished by the switching circuit which switches the transceiver signal onto one of the antenna elements. The radio-frequency transceiver unit comprises a receiver, a transmitter and a signal duplexer. The received signal distribution unit and the transmitted signal distribution unit are formed as a single distribution unit of signal from the radio-frequency transceiver unit. The modem performs digital processing of signals, while the antenna beam control unit generates control signals for the signal distribution unit based on service data provided by the modem.

FIG. 4 shows that the switching circuit is to perform switching of high-frequency signal generated on the carrier frequency. Practically, these frequencies are in the range of 30-100 GHz. Currently, switching of such a high frequency signal cannot be done without loss. As said above, known millimeter wave band switches with one input and N outputs have losses of about 0.7÷1.5*N dB, and, thus, a four-position switch has losses of approximately 3.5-4 dB. These losses are doubled at the radio-relay system's mate side, which causes a considerable loss of signal strength and, consequently, shortens the maximum signal coverage more than two times.

Thus, for efficient and feasible implementation of millimeter wave band beam-scanning antennas and for larger coverage of radio communications systems with beam-scanning antennas operating in transceiver duplex mode, it is necessary to reduce losses in the switching circuit.

SUMMARY OF THE INVENTION

To achieve the specified objective, it is provided a radio-relay communication system comprising
  a beam-scanning antenna with at least two primary antenna elements,
  a radio-frequency transceiver unit,
  a received signal distribution unit configured to distribute a received signal and connected to the radio-frequency transceiver unit,
  a transmitted signal distribution unit configured to distribute a transmitted signal and connected to the radio-frequency transceiver unit,
  a modem comprising a modem reception part and a modem transmission part and
  an antenna beam control unit configured to control a beam position and connected to the modem reception part and the modem transmission part via supervisory channels, the antenna beam control unit being further connected to the received signal distribution unit and the transmitted signal distribution unit via beam control channels, thus enabling supply of beam control signals to them,
  wherein
the radio-relay communication system comprises at least one further radio-frequency transceiver unit connected to both the received signal distribution unit and the transmitted signal distribution unit, while each radio-frequency transceiver unit is connected to at least one of the primary antenna elements,
  wherein the received signal distribution unit is connected to the modem reception part and is configured to supply a signal received from at least one of the radio-frequency transceiver units corresponding to one of the beam control signals from the antenna beam control unit, to the modem reception part,
  wherein the transmitted signal distribution unit is connected to the modem transmission part and is configured to supply a transmitted signal from the modem transmission part to at least one of the radio-frequency units corresponding to one of the beam control signals from the antenna beam control unit and
  wherein when the received signal distribution unit and the transmitted signal distribution unit select at least one of the radio-frequency units, other of the radio-frequency units are disabled.

The proposed radio-relay communication system allows efficient operation of different types of beam-scanning antennas so as to reduce losses during beam switching. This is ensured by introduction into the known radio-relay system of at least one more radio-frequency transceiver unit connected to at least one primary antenna element of the beam-scanning antenna. Thus, according to the invention, the received signal distribution unit and the transmitted signal distribution unit provide selection of at least one radio-frequency transceiver unit for processing the received signal and generating the transmitted one in the designated ports. The radio-relay system provides that distribution of both the received and the transmitted signal is accomplished between radio-frequency units or on an IF or baseband frequency (prior to up-conversion of the transmitted signal to the carrier frequency or after down-conversion of the signal from the carrier frequency), or in the digital area. This allows to design distribution units with considerably lower (down to negligible) losses as compared with millimeter wave band switching circuits used in the radio-relay communication systems with beam-scanning antennas known in the art.

Thus, the embodiment of the radio-relay communication system with low losses in signal distribution units provides electronic beam scanning with each beam having gain during scanning approximately equal to the gain of the radio-relay antenna without scanning. Furthermore, this is provided regardless of the type of antenna used.

For example, according to one embodiment, the beam-scanning antenna is a parabolic reflector antenna.

In another embodiment, the beam-scanning antenna can be a Cassegrain antenna.

In yet another embodiment, the beam-scanning antenna is a lens antenna having a thin lens and spaced-apart primary antenna elements.

In yet another embodiment, the beam-scanning antenna is a Luneburg lens.

In yet another embodiment, the beam-scanning antenna is an integrated lens antenna, wherein the primary antenna elements are arranged directly on a surface of the lens.

According to one embodiment, each of the received signal distribution unit and the transmitted signal distribution unit comprises at least one low-frequency analog switch switchable between at least two ports. Such configuration of a beam-scanning antenna provides signal distribution units operating on the transceiver's IF or baseband frequency.

In a preferred embodiment, the received signal distribution unit and the transmitted signal distribution unit are add-on digital logic units in the modem.

According to one embodiment, the received signal distribution unit and the transmitted signal distribution unit are machine-readable media arranged in the modem and storing a software code.

According to another embodiment, the system further comprises high-frequency switching circuits, which are connected to the radio-frequency transceiver units and to the primary antenna elements of the beam-scanning antenna, wherein each of the high-frequency switching circuits is configured to select at least one antenna element so as to receive and/or transmit a signal by means of the beam-scanning antenna.

According to yet another embodiment, each radio-frequency transceiver unit comprises a radio-frequency transmitter, a radio-frequency receiver, and a diplexer configured for frequency division of a signal received by the antenna and a signal transmitted onto the antenna, thus providing frequency division duplex mode communication. Such configuration permits to achieve higher data transmission rate.

According to yet another embodiment, each radio-frequency transceiver unit comprises a radio-frequency transmitter, a radio-frequency receiver, and a switch configured for time division of a signal received by the antenna and a signal transmitted onto the antenna, thus providing time division duplex mode communication.

According to yet another embodiment, each radio-frequency transceiver unit comprises:
 a radio-frequency transmitter connected to at least one primary antenna element to transmit a signal using the first linear polarization; and
 a radio-frequency receiver connected to at least one primary antenna element to receive a signal using the second linear polarization orthogonal to the first linear polarization.

According to yet another embodiment, the beam-scanning antenna is configured to generate only one narrow radiation pattern beam at each instant of time. Generation of only one narrow radiation pattern beam makes possible to use the beam-scanning antenna in point-to-point radio communication systems.

According to yet another embodiment, the beam-scanning antenna is configured to generate at least two narrow radiation pattern beams at each instant of time. This allows using the beam-scanning antenna in point-to-multipoint radio communication systems.

Preferably, when the received signal distribution unit and the transmitted signal distribution unit select at least one of the radio-frequency units, other of the radio-frequency units are disabled. This provides lower power consumption by the radio-relay communication system with beam-scanning antenna in any of considered embodiments.

DETAILED DESCRIPTION

More specifically, the invention provides a radio-relay communication system which comprises a plurality of radio-frequency transceiver units, each one generating transmitted signal on the millimeter wave band carrier frequency and extracting the received signal from the carrier wave, a received signal distribution unit and a transmitted signal distribution unit. Each radio-frequency transceiver unit is electrically connected with at least one primary antenna element of the beam-scanning antenna and antenna beam scanning is accomplished by means of the received signal distribution unit and the transmitted signal distribution unit selecting at least one of radio-frequency transceiver units for processing of the received signal and generation of the transmitted signal in designated direction. According to one embodiment, with selection done, other radio-frequency units are disabled to reduce power consumption.

According to the invention, one received signal distribution unit and one transmitted signal distribution unit and at least two radio-frequency transceiver units connected with primary antenna elements are used in the radio-relay communication system.

Using a plurality of radio-frequency units connected with corresponding primary antenna elements permits to reduce or fully eliminate losses in the radio front-end during switching between different beam directions done by means of a switching circuit operating in a low frequency range (namely, on the transceiver IF or baseband frequency) and performing said switching prior to the signal modulating the carrier frequency, or by means of a switching circuit implemented in the form of a digital logic unit.

Figure 1:
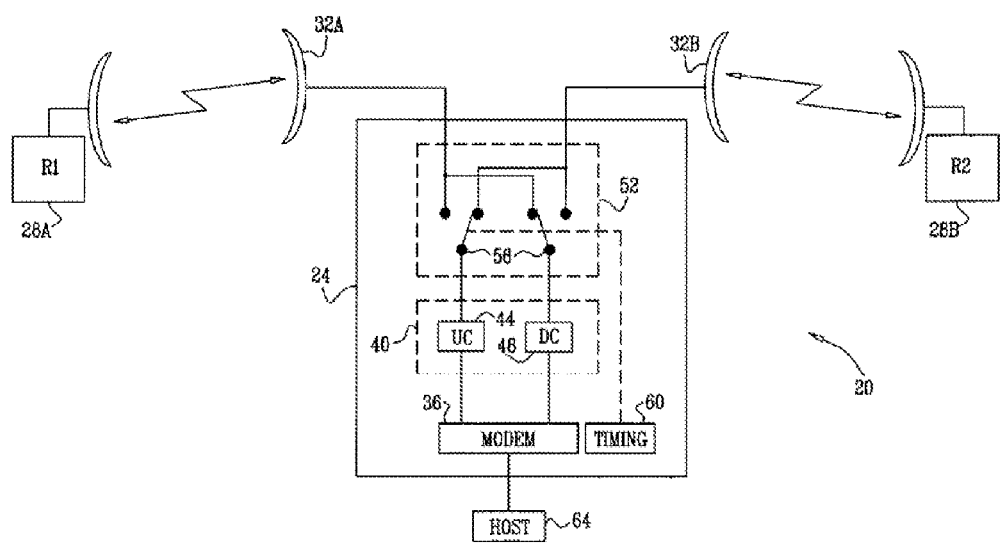
FIG. 1 shows the functional diagram of the known point-to-multipoint radio-relay communication system (prior art).
Figure 2:
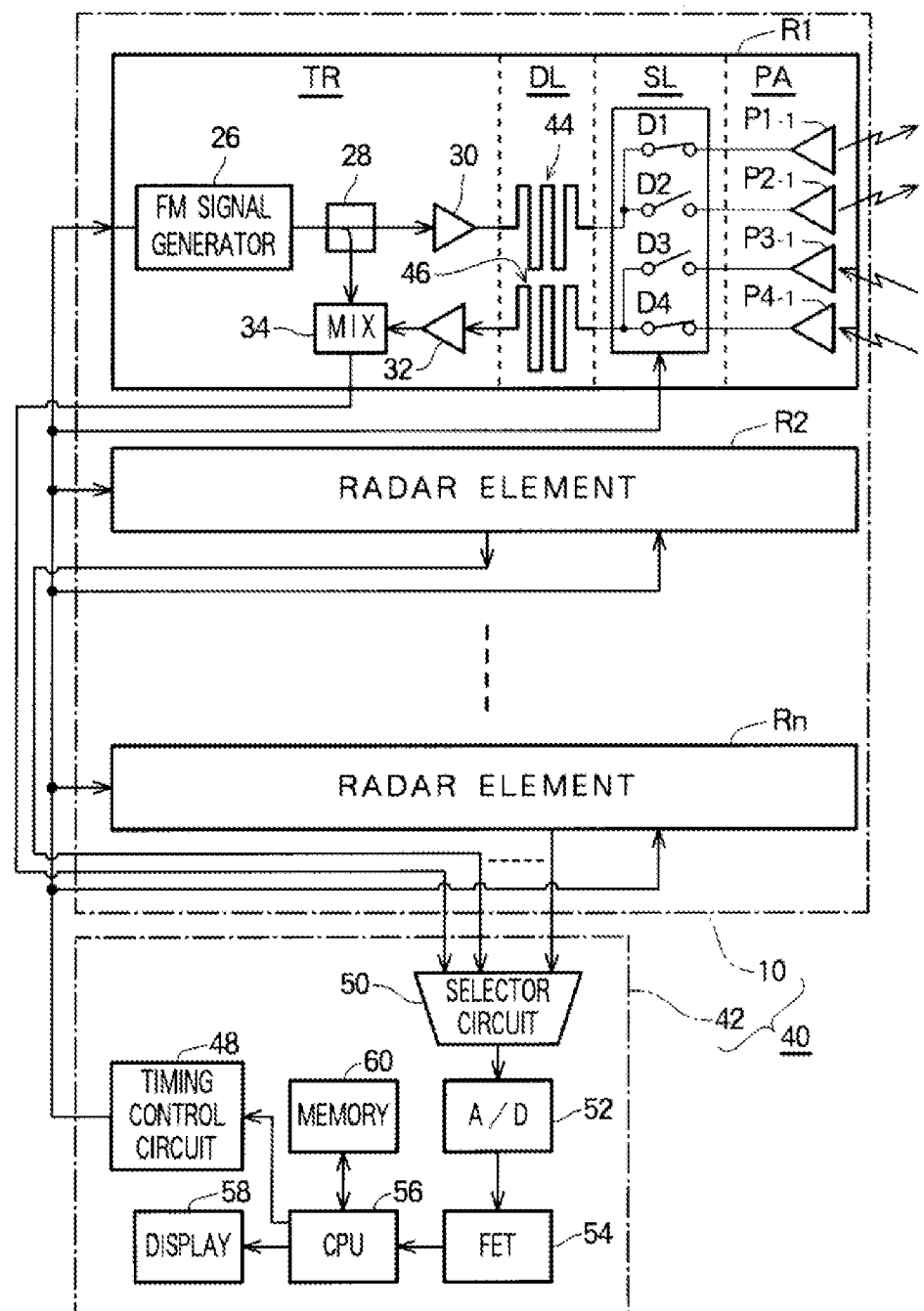
FIG. 2 represents the general functional diagram of the automotive radar disclosed in U.S. Pat. No. 6,034,641 (prior art).
Figure 3:
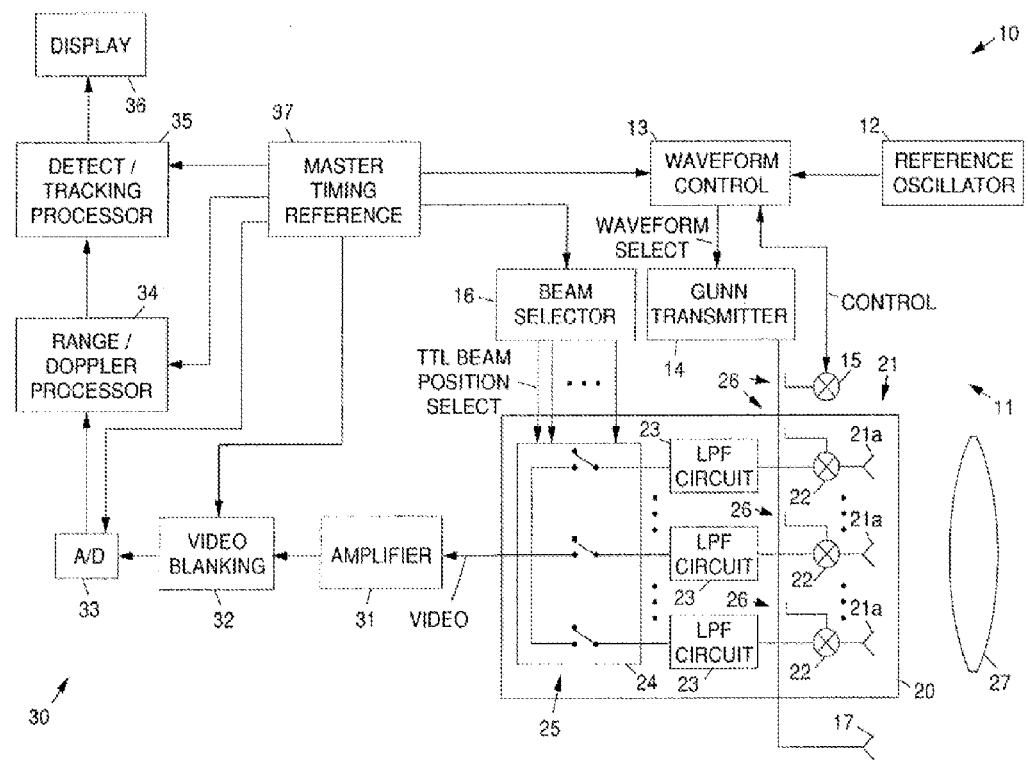
FIG. 3 shows the functional diagram of the automotive radar disclosed in U.S. Pat. No. 5,486,832 (prior art)
Figure 4:
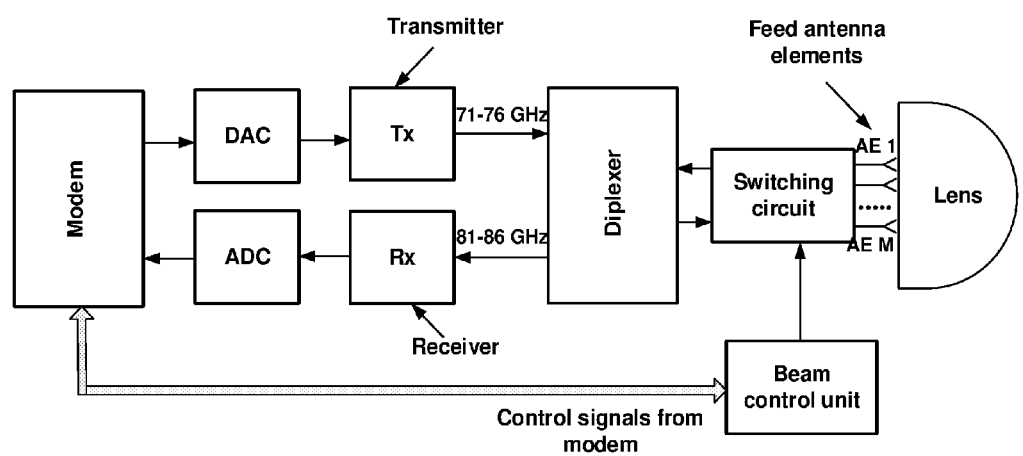
FIG. 4 shows the functional diagram of the known radio-relay communication system with electronic beam scanning (prior art).
Figure 5:
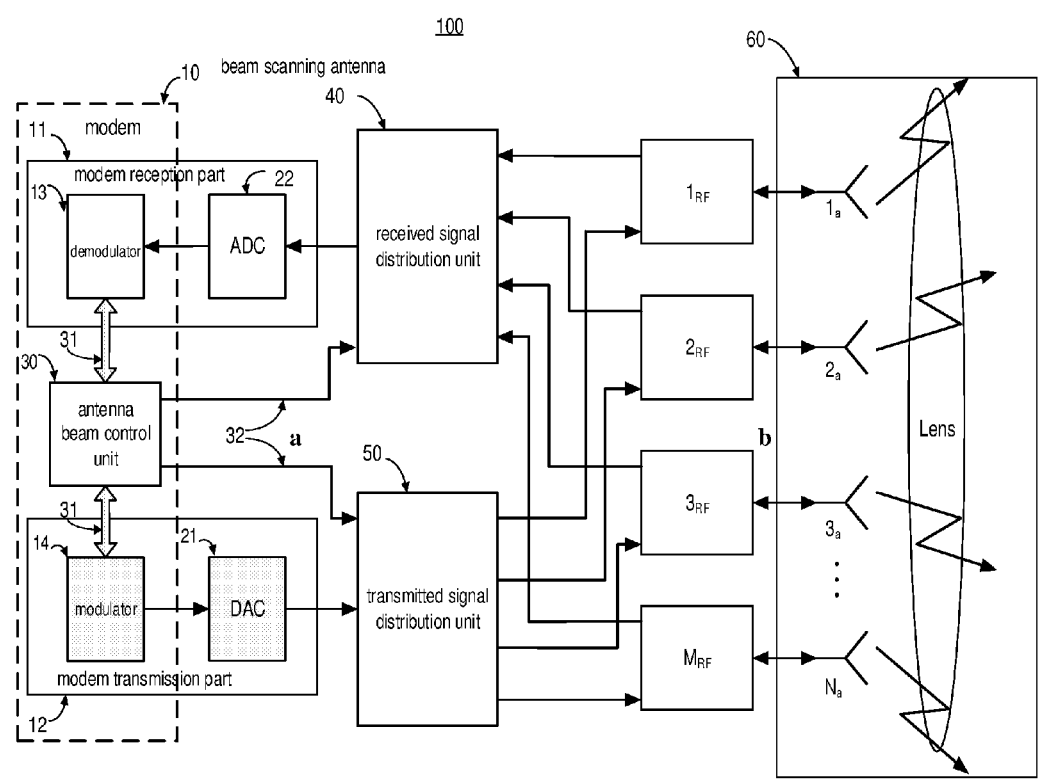
FIG. 5 shows the functional diagram of one embodiment of the radio-relay communication system with the received signal distribution unit and transmitted signal distribution unit implemented on the transceiver's IF or baseband frequency in accordance with the present invention

FIG. 5 shows functional diagram of the radio-relay communication system 100 according to one of the preferred embodiments comprising primary antenna elements $1_a$, $2_a$ . . . $N_a$, radio-frequency transceiver units $1_{RF}$, $2_{RF}$, . . . $M_{RF}$, a received signal distribution unit 40 and a transmitted signal distribution unit 50, which operate on the transceiver baseband frequency. In this embodiment, a modem 10 comprising a modem reception part 11 that includes demodulator 13 for the processing of the received signal, and a modem transmission part 12 that includes modulator 14 for the generation of the transmitted signal, is connected to the Digital-to-Analog Converter (DAC) 21 and Analog-to-Digital Converter (ADC) 22 units and to an antenna beam control unit 30 operating through supervisory channels 31. The received and transmitted signal distribution units 40, 50 are connected to the DAC 21 and ADC 22 units, to the radio-frequency transceiver units $1_{RF}$, $2_{RF}$, . . . $M_{RF}$ and with the antenna beam control unit 30 through the control channels 32. Each radio-frequency transceiver unit $1_{RF}$, $2_{RF}$, . . . $M_{RF}$ is in its turn connected to one primary antenna element ($1_a$, $2_a$, . . . $N_a$) of a beam-scanning antenna 60. According to this embodiment, the information signal generated in the modem's transmission part 12 comes to the DAC 21 to form baseband analog signal. This signal is input in the transmitted signal distribution unit 50 which makes selection based on the control signals from the antenna beam control unit 30 of at least one of the radio-frequency units $1_{RF}$, $2_{RF}$, . . . $M_{RF}$ to modulate the carrier frequency with the signal. Thus, the signal-modulated carrier frequency comes to at least one of the primary antenna elements $1_a, 2_a, \ldots N_a$ to be transmitted in the directions corresponding to these antenna elements $1_a, 2_a, \ldots N_a$. Whereas, signal on the carrier frequency received from these directions comes to at least one radio-frequency transceiver units of $1_{RF}, 2_{RF}, \ldots M_{RF}$ selected by the received signal distribution unit 40 to generate the signal on the baseband frequency. The signal on the baseband frequency comes via the ADC 22 to the modem's reception part 11 for demodulation.

In this embodiment, each signal distribution unit comprises at least one low-frequency analog switch between several ports. The received signal distribution unit 40 and the transmitted signal distribution unit 50 are configured to supply signal to a plurality of radio-frequency units $1_{RF}, 2_{RF}, \ldots M_{RF}$ at once, which allows using the proposed system as a point-to-multipoint radio-relay communication system. In this embodiment, the antenna beam control unit 30 is formed as a digital logics unit that generates control signals for said signal distribution units based on the information coming from the modem's receiver and transmitter over the supervisory channels 31. Control signals come to said signal distribution units over the control channels 32. Based on the control signals (for example, DC signals provided to change the state of the switch), the received signal distribution unit 40 and the transmitted signal distribution unit 50 (in the simplest case, switch) select at least one radio-frequency transceiver unit $1_{RF}, 2_{RF}, \ldots M_{RF}$ for processing the received and generation of the transmitted information signals. The selected radio-frequency units $1_{RF}, 2_{RF}, \ldots M_{RF}$ are connected to primary antenna elements $1_a, 2_a, \ldots N_a$, excitement of which generates radiation pattern beams of the beam-scanning antenna 60 in designated directions.

Generation of control signals (and, thus, selection of the direction of beams) can be done by the antenna beam control unit 30 using different algorithms. These algorithms are based on certain communication quality characteristics analyzed by the modem 10 (such as data transmission rate, used type of modulation and coding scheme, signal-to-noise ratio, error vector magnitude value, received signal strength indicator). For this purpose, the proposed radio-relay communication system is connected to the modem's reception and transmission parts 11, 12 via supervisory channels 31. Preferably, the antenna beam control unit 30 is a digital logics unit.

In the simplest case, such algorithms consist in maximization of received signal power (or signal-to-noise ratio) by search (exhaustive or selective) between beam directions of the beam-scanning antenna 60. In one of the examples, such search is accomplished with the support of feedback from a partner exchange radio-relay system on another end of a point-to-point radio link. For instance, to carry out mutual tuning of beam direction of antennas of two radio-relay systems in a link, the algorithm may consist in the following steps: A) transmission of signal in certain main antenna beam directions by the first system; B) with the direction of the main antenna beam of the first system remaining unchanged, signal reception over some directions of the main antenna beam of the second system; C) selection of a combination of main antenna beams of both systems, corresponding to the maximum value of a specified criterion (for example, the maximum of the power received by the second system), and then D) applying the selected main antenna beam directions for one or to both radio-relay systems.

In other embodiments, more complex modifications of beam tuning algorithms involve analysis of the reasons of degradation of characteristics (weather conditions, twists/sways of mounting structures, emergence of obstructions or scatterers between two link ends, etc.) and, based on this analysis, selection of the control procedure for the beam-scanning antenna 60 to restore the characteristics.

Figure 6:
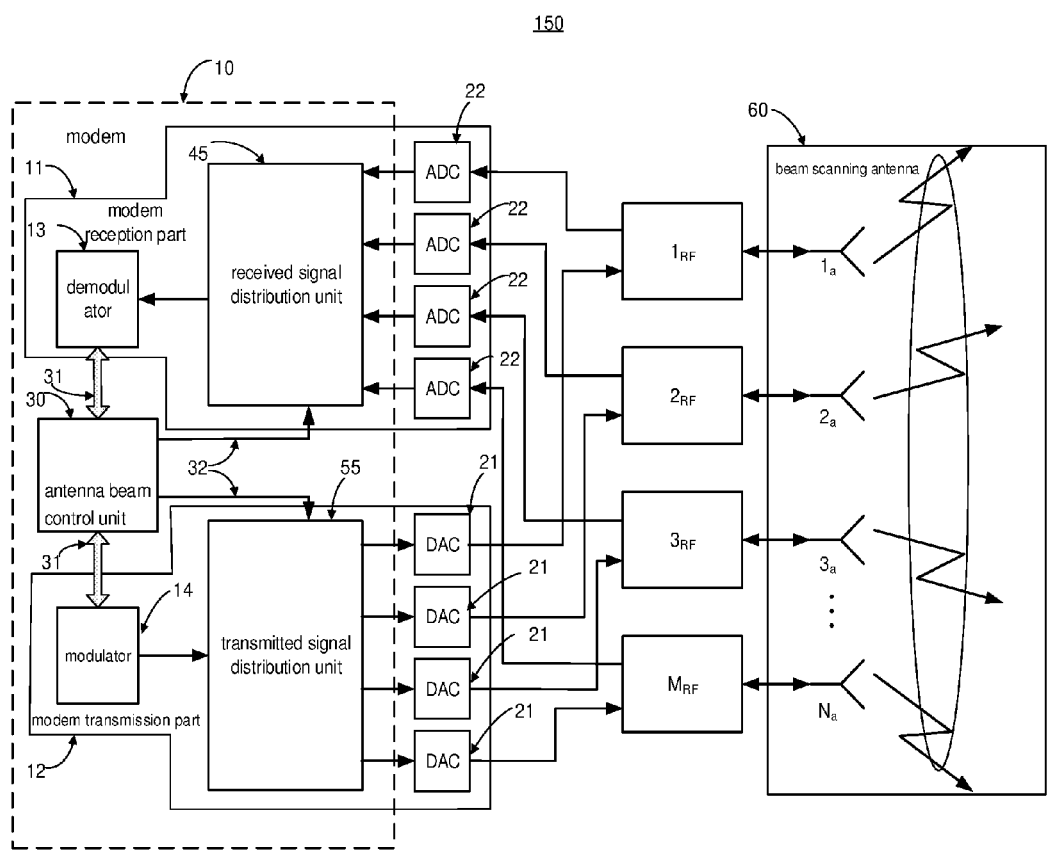
FIG. 6 shows the functional diagram of one embodiment of the radio-relay communication system with the received signal distribution unit and transmitted signal distribution unit implemented in the form of add-on digital logic units in accordance with the present invention.

FIG. 6 shows the functional diagram of the radio-relay communication system 150 according to yet another preferred embodiment. Here, the received signal distribution unit 45 and the transmitted signal distribution unit 55 are add-on digital logic units arranged in the modem 10. In other embodiments the received signal distribution unit 45 and the transmitted signal distribution unit 55 are machine-readable data media arranged in the modem 10 and storing a software code. Corresponding elements of the system 100 have the same referential signs. In the shown embodiment, modem 10 is connected to the received signal distribution unit 45 and the transmitted signal distribution unit 55 and the antenna beam control unit 30 via supervisory channels 31. The modem 10 comprises a modem reception part 11 that comprises demodulator 13 for processing the received signal and a modem transmission part 12 that comprises modulator 14 for generation of the transmitted signal. The received and transmitted signal distribution units 45 and 55 are connected to the DAC 21 and ADC 22 modules and to the antenna beam control unit 30 via control channels 32. Each radio-frequency transceiver unit $1_{RF}, 2_{RF}, \ldots M_{RF}$ is further connected to one DAC 21 and ADC 22 unit and one primary antenna element ($1a, 2a, \ldots Na$) of the beam-scanning antenna 60. According to this embodiment, the information signal generated at the modem transmission part 12 comes to the transmission signal digital distribution unit 55 and then to at least one digital-to-analog convertor 21 for generation of the analog signal on a baseband frequency. In order to generate a signal on the carrier frequency, this signal is input into at least one radio-frequency transceiver unit $1_{RF}, 2_{RF}, \ldots M_{RF}$ selected by the transmitted signal distribution unit 55 based on the control signals coming from the antenna beam control unit 30. Thus, the signal on the carrier wave comes to at least one primary antenna element $1_a, 2_a, \ldots N_a$ for transmission in the directions/ports designated for these antenna elements $1_a, 2_a, \ldots N_a$. In the same manner, the signal on the carrier frequency that was received from these directions comes to at least one radio-frequency transceiver unit $1_{RF}, 2_{RF}, \ldots M_{RF}$, selected by the received signal distribution unit 45, for generation of a signal on a baseband frequency. The signal on the baseband frequency comes to the appropriate ADC 22 modules for demodulation in the reception part 11 of the modem 10.

In this embodiment, the antenna beam control unit 30 is a digital module generating control signals for the distribution units based on the information received from the modem reception and transmission parts 11, 12 via supervisory channels 31.

In this embodiment, the received and the transmitted signal distribution units 45, 55 also select a signal for processing from a single radio-frequency transceiver unit (in the point-to-point system) or from a plurality of radio-frequency transceiver units at once (in the point-to-multipoint system).

Furthermore, in one of the embodiments, a high-frequency switching unit is provided between each radio-frequency transceiver unit $1_{RF}, 2_{RF}, \ldots M_{RF}$ and an array of antenna elements $1_a, 2_a, \ldots N_a$. This permits to select a beam position during scanning by both the received and transmitted signal distribution units 45, 55, and the high-frequency switching circuit. Such radio-relay communication system can be used to increase the number of antenna elements $1_a$, $2_a$, ... $N_a$ (with the same number of radio-frequency units) and, consequently, the number of scanning beam positions. This provides a trade-off between losses of the signal in the millimeter wave radio front-end and an angle of scanning sector.

Figure 7:
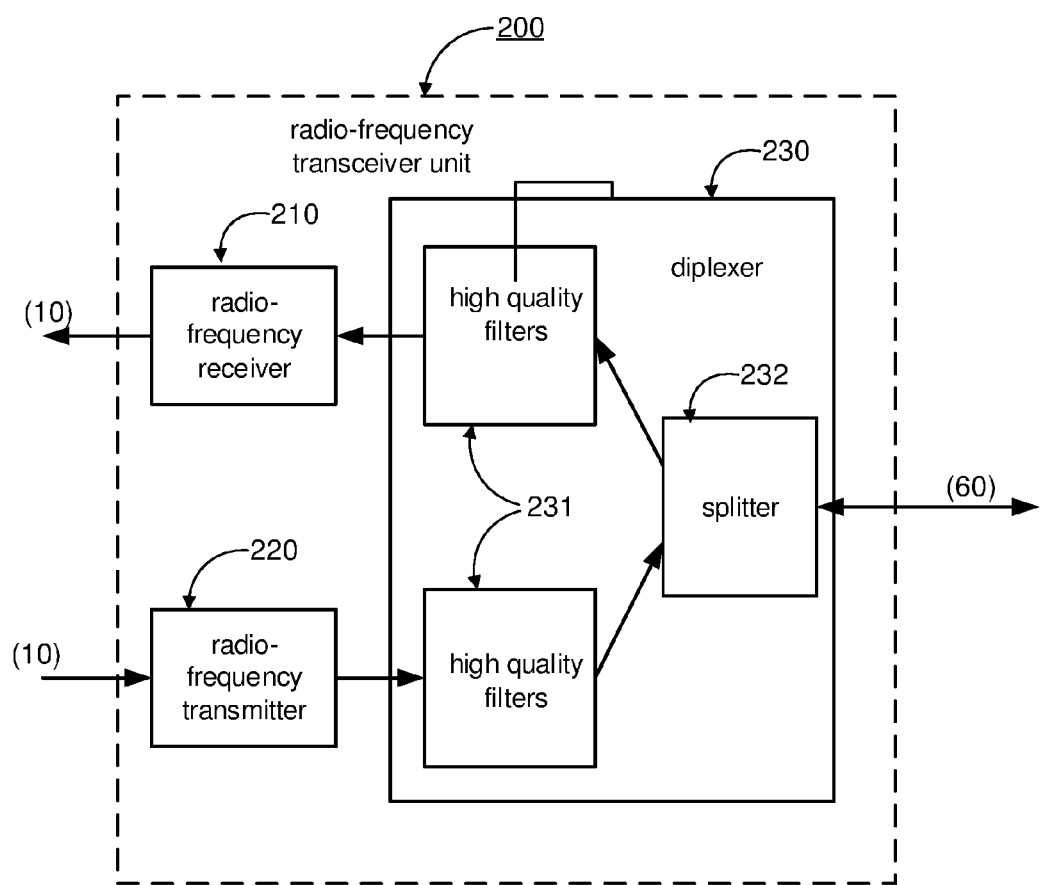
FIG. 7 shows the functional diagram of one embodiment of the radio-frequency transceiver unit for the radio-relay communication system with frequency division duplexing in accordance with the present invention.

FIG. 7 shows the functional diagram of the radio-frequency transceiver unit 200 in accordance with the embodiment, wherein each radio-frequency transceiver unit 200 comprises a radio-frequency transmitter 220, a radio-frequency receiver 210 and a diplexer 230 connected to the radio-frequency receiver 210 and transmitter 220. The diplexer 230 is configured for frequency division of the signals received by the beam-scanning antenna 60 and transmitted to the beam-scanning antenna 60, which enables frequency division duplex communication mode and, consequently, permits to increase data transmission rate. In this embodiment, a signal on a baseband or IF frequency is input into the radio-frequency transceiver unit 200. After transformations in the radio-frequency transmitter 220, a signal on a carrier wave is generated which, passing through the diplexer 230, comes to the radio-frequency unit's 200 common port. The received signal on the carrier wave comes to the radio-frequency unit's 200 common port and, passing through the diplexer 230, is processed in the radio-frequency transmitter 220 for generation of the signal on the baseband frequency. In this case, the received and the transmitted signals have different carrier waves and isolation of the signals is provided by high quality filters 231 and the splitter 232 of the diplexer 230.

Figure 8:
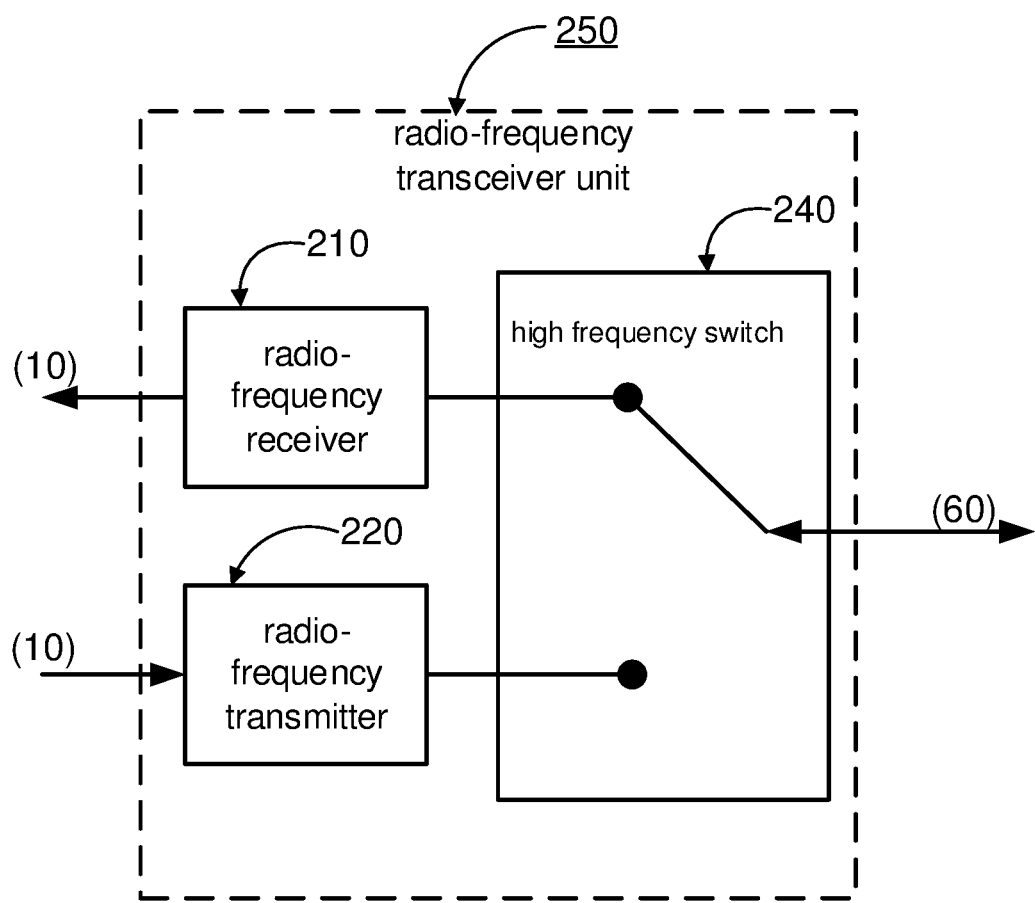
FIG. 8 shows the functional diagram of one embodiment of the radio-frequency transceiver unit for the radio-relay communication system with time division duplexing in accordance with the present invention.

FIG. 8 shows a functional diagram of the radio-frequency transceiver unit 250 in accordance with the embodiment, wherein each radio-frequency transceiver unit 250 comprises a radio-frequency transmitter 220, a radio-frequency receiver 210 and a high-frequency switch 240 connected to the radio-frequency receiver 210 and transmitter 220. The high-frequency switch 240 provides time division of the signals received by the beam-scanning 60 antenna and transmitted onto the beam-scanning 60 antenna, which provides the time division duplex communication mode. In this embodiment, the signal on the baseband frequency coming to the radio-frequency transceiver unit 250 input is transformed in the radio-frequency transmitter 220 into the signal on the carrier wave. This signal comes to the common port of the radio-frequency transceiver unit 250 via the high-frequency switch 240 at certain time intervals designated for signal transmission. The received signal on the carrier wave comes to the common port of the radio-frequency transceiver unit 250 and, passing through the high-frequency switch 240 at the other time intervals, designated for signal reception, is processed in the radio-frequency receiver 210 for down-conversion of the signal on the baseband frequency. In this embodiment, the received and the transmitted signals are processed at different time intervals, which is ensured by the high-frequency switch 240. At the same time, it is important that the switch 240 is included into all radio-relay systems with time division duplexing regardless of whether a scanning or other type of antenna is used.

Further, each radio-frequency transceiver unit of the radio-relay communication system can comprise a radio-frequency transmitter connected to at least one primary antenna element for transmission of signal using one linear polarization, and a radio-frequency receiver connected to at least one primary antenna element for reception of the signal using the second linear polarization orthogonal to the first linear polarization.

In different embodiments, different types of aperture antennas are used as beam-scanning antennas, for example parabolic reflector antennas, Cassegrain antennas, Luneburg lens, lens antennas with a thin lens and spaced-apart antenna elements, integrated lens antennas, which have antenna elements arranged directly on the focal plane surface of the lens. In all such embodiments, an array of primary antenna elements can be used to provide electronic scanning.

In one embodiment, the radio-relay communication system generates only one radiation pattern main beam at any one time for the point-to-point radio communication.

In another embodiment, the radio-relay system generates a plurality of main beams at any one time for the point-to-multipoint radio communication.

The radio-relay communication system is industrially applicable, as all units comprised therein are used in the existing millimeter wave band radio-relay systems are known from the prior art. For example, modern radio-relay systems comprise radio-frequency units operating in the frequency bands from 2 up to 86 GHz using frequency or time division transmission modes. Functional diagrams of the known radio-frequency units are similar to those shown in FIGS. 7 and 8. In this embodiment, the control module, the received signal distribution unit and the transmitted signal distributed unit are implemented using known software and hardware means, such as programmable and application-specific integrated circuits and analog switching units. Various designs of beam-scanning antennas are also well known, some examples are described in the Background.

The disclosed radio-relay communication system is designed to operate at frequency range of 71-86 GHz and is equipped with antenna providing radiation pattern beamwidth at half power level of less than 1° for each beam when scanning is used. The radio-relay communication system can operate at the frequency range of 57-66 GHz and is equipped with antenna providing the radiation pattern beamwidth at half power level of less than 3° for each beam when scanning is used.

The disclosed system in any of the above embodiments can be used as part of the millimeter wave band radio-relay communication systems.

The invention claimed is:

1. A radio-relay communication system, comprising:
   a beam-scanning antenna with at least two primary antenna elements,
   a radio-frequency transceiver unit,
   a received signal distribution unit adapted to distribute a received signal and connected to the radio-frequency transceiver unit,
   a transmitted signal distribution unit adapted to distribute a transmitted signal and connected to the radio-frequency transceiver unit,
   a modem comprising a modem reception part and a modem transmission part and
   an antenna beam control unit adapted to control a beam position and connected to the modem reception part and the modem transmission part via supervisory channels, the antenna beam control unit being further connected to the received signal distribution unit and the transmitted signal distribution unit via beam control channels, thus enabling supply of beam control signals to them,
   wherein
   the radio-relay communication system comprises at least one further radio-frequency transceiver unit connected to both the received signal distribution unit and the transmitted signal distribution unit, while each radio-frequency transceiver unit is connected to at least one of the primary antenna elements, wherein the received signal distribution unit is connected to the modem reception part and is adapted to supply a signal received from at least one of the radio-frequency transceiver units corresponding to one of the beam control signals from the antenna beam control unit, to the modem reception part, wherein the transmitted signal distribution unit is connected to the modem transmission part and is adapted to supply a transmitted signal from the modem transmission part to at least one of the radio-frequency units, corresponding to one of the beam control signals from the antenna beam control unit and wherein, when the received signal distribution unit and the transmitted signal distribution unit select at least one of the radio-frequency units, other of the radio-frequency units are disabled.

2. The radio-relay communication system according to claim 1, wherein the beam-scanning antenna is a parabolic reflector antenna.

3. The radio-relay communication system according to claim 1, wherein the beam-scanning antenna is a Cassegrain antenna.

4. The radio-relay communication system according to claim 1, wherein the beam-scanning antenna is a lens antenna with a thin lens and spaced-apart primary antenna elements.

5. The radio-relay communication system according to claim 1, wherein the beam-scanning antenna is a Luneburg lens.

6. The radio-relay communication system according to claim 1, wherein the beam-scanning antenna is an integrated lens antenna, wherein the primary antenna elements are arranged directly on a surface of the lens.

7. The radio-relay communication system according to claim 1, wherein the received signal distribution unit and the transmitted signal distribution unit are add-on digital logic units in the modem.

8. The radio-relay communication system according to claim 1, wherein the received signal distribution unit and the transmitted signal distribution unit are machine-readable media arranged in the modem and storing a software code.

9. The radio-relay communication system according to claim 1, wherein each radio-frequency transceiver unit comprises a radio-frequency transmitter, a radio-frequency receiver, and a diplexer adapted for frequency division of a signal received by the antenna and a signal transmitted onto the antenna, thus providing frequency division duplex mode communication.

10. The radio-relay communication system according to claim 1, wherein each radio-frequency transceiver unit comprises a radio-frequency transmitter, a radio-frequency receiver, and a switch adapted for time division of a signal received by the antenna and a signal transmitted onto the antenna, thus providing time division duplex mode communication.

11. The radio-relay communication system according to claim 1, wherein each radio-frequency transceiver unit comprises:

a radio-frequency transmitter connected to at least one primary antenna element to transmit a signal using the first linear polarization; and a radio-frequency receiver connected to at least one primary antenna element to receive a signal using the second linear polarization orthogonal to the first linear polarization.

12. The radio-relay communication system according to claim 1, wherein the beam-scanning antenna is adapted to generate only one narrow radiation pattern beam at each instant of time.

13. The radio-relay communication system according to claim 1, wherein the beam-scanning antenna is adapted to generate at least two narrow radiation pattern beams at each instant of time.

14. A radio-relay communication system, comprising:

a beam-scanning antenna with at least two primary antenna elements, a radio-frequency transceiver unit, a received signal distribution unit adapted to distribute a received signal and connected to the radio-frequency transceiver unit, a transmitted signal distribution unit adapted to distribute a transmitted signal and connected to the radio-frequency transceiver unit, a modem comprising a modem reception part and a modem transmission part, and an antenna beam control unit adapted to control a beam position and connected to the modem reception part and the modem transmission part via supervisory channels, the antenna beam control unit being further connected to the received signal distribution unit and the transmitted signal distribution unit via beam control channels, thus enabling supply of beam control signals to them, wherein the radio-relay communication system comprises at least one further radio-frequency transceiver unit connected to both the received signal distribution unit and the transmitted signal distribution unit, while each radio-frequency transceiver unit is connected to at least one of the primary antenna elements, wherein the received signal distribution unit is connected to the modem reception part and is adapted to supply a signal received from at least one of the radio-frequency transceiver units corresponding to one of the beam control signals from the antenna beam control unit, to the modem reception part, wherein the transmitted signal distribution unit is connected to the modem transmission part and is adapted to supply a transmitted signal from the modem transmission part to at least one of the radio-frequency units, corresponding to one of the beam control signals from the antenna beam control unit, and wherein each of the received signal distribution unit and the transmitted signal distribution unit comprises at least one low-frequency analog switch switchable between at least two ports.

15. A radio-relay communication system, comprising:

a beam-scanning antenna with at least two primary antenna elements, a radio-frequency transceiver unit, a received signal distribution unit adapted to distribute a received signal and connected to the radio-frequency transceiver unit, a transmitted signal distribution unit adapted to distribute a transmitted signal and connected to the radio-frequency transceiver unit, a modem comprising a modem reception part and a modem transmission part, and an antenna beam control unit adapted to control a beam position and connected to the modem reception part and the modem transmission part via supervisory channels, the antenna beam control unit being further connected to the received signal distribution unit and the transmitted signal distribution unit via beam control channels, thus enabling supply of beam control signals to them, wherein the radio-relay communication system comprises at least one further radio-frequency transceiver unit connected to both the received signal distribution unit and the transmitted signal distribution unit, while each radio-frequency transceiver unit is connected to at least one of the primary antenna elements, wherein the received signal distribution unit is connected to the modem reception part and is adapted to supply a signal received from at least one of the radio-frequency transceiver units corresponding to one of the beam control signals from the antenna beam control unit, to the modem reception part, wherein the transmitted signal distribution unit is connected to the modem transmission part and is adapted to supply a transmitted signal from the modem transmission part to at least one of the radio-frequency units, corresponding to one of the beam control signals from the antenna beam control unit, and wherein the system further comprises high-frequency switching circuits which are connected to the radio-frequency transceiver units and to the primary antenna elements of the beam-scanning antenna, wherein each of the high-frequency switching circuits is adapted to select at least one antenna element so as to receive and/or transmit a signal by means of the beam-scanning antenna.

* * * * *